US009589049B1

(12) United States Patent
Carrier et al.

(10) Patent No.: US 9,589,049 B1
(45) Date of Patent: Mar. 7, 2017

(54) CORRECTING NATURAL LANGUAGE PROCESSING ANNOTATORS IN A QUESTION ANSWERING SYSTEM

(71) Applicant: International Business Machines Corporation, Armonk, NY (US)

(72) Inventors: Scott R. Carrier, Apex, NC (US); Amy E. Veatch, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/965,064

(22) Filed: Dec. 10, 2015

(51) Int. Cl.
*G06F 17/28* (2006.01)
*G06F 17/30* (2006.01)
*G06F 17/24* (2006.01)

(52) U.S. Cl.
CPC ...... *G06F 17/30654* (2013.01); *G06F 17/241* (2013.01); *G06F 17/30648* (2013.01); *G06F 17/30663* (2013.01); *G06F 17/30657* (2013.01)

(58) Field of Classification Search
CPC ............... G06F 17/271; G06F 17/2735; G06F 17/2785; G06F 17/3065
USPC ........................................................ 704/1, 9
See application file for complete search history.

(56) References Cited

U.S. PATENT DOCUMENTS

| 7,386,454 | B2 | 6/2008 | Gopinath et al. |
| 7,725,408 | B2 | 5/2010 | Lee et al. |
| 2003/0189603 | A1 | 10/2003 | Goyal et al. |
| 2004/0162724 | A1* | 8/2004 | Hill ........................ G10L 15/22 704/231 |
| 2005/0143999 | A1* | 6/2005 | Ichimura ................. G10L 15/26 704/251 |
| 2007/0038616 | A1* | 2/2007 | Guha ................ G06F 17/30672 |
| 2007/0288442 | A1* | 12/2007 | Iwayama .......... G06F 17/30011 |
| 2008/0104065 | A1* | 5/2008 | Agarwal ................ G06Q 10/10 |
| 2008/0195378 | A1* | 8/2008 | Nakazawa ........ G06F 17/30654 704/9 |
| 2010/0005413 | A1* | 1/2010 | Liang ....................... G09B 7/00 715/781 |
| 2011/0087656 | A1* | 4/2011 | Oh .................... G06F 17/30654 707/727 |

(Continued)

OTHER PUBLICATIONS

Diekerma, et al. "Evaluation of restricted domain question-answering systems." 2004, pp. 1-8.*

(Continued)

*Primary Examiner* — James Wozniak
(74) *Attorney, Agent, or Firm* — VanLeeuwen & VanLeeuwen; Diana R. Gerhardt

(57) ABSTRACT

An approach is provided to correct natural language processing (NLP) annotators. The approach operates by receiving a set of supporting text noted by a user in response to the user identifying an error to a user question in a question answering (QA) system. The set of supporting text includes one or more text passages from which a correct answer should have been generated by the QA system. The QA system generates one or more scored candidate corrections with each of the scored candidate corrections is based on the identified error and the set of supporting text. The user can then select one or more of the scored candidate corrections as a confirmed correction to the error. The confirmed corrections are then applied to a corpus that is utilized by the QA system when answering questions.

17 Claims, 8 Drawing Sheets

(56) References Cited

U.S. PATENT DOCUMENTS

| | | | | |
|---|---|---|---|---|
| 2011/0153312 A1* | 6/2011 | Roberts | G06F 17/30654 | 704/9 |
| 2012/0089622 A1* | 4/2012 | Fan | G06F 17/30675 | 707/749 |
| 2012/0124073 A1* | 5/2012 | Gross | G06F 17/30873 | 707/767 |
| 2012/0131016 A1* | 5/2012 | Brown | G06F 17/30696 | 707/748 |
| 2012/0167007 A1* | 6/2012 | Ross | G06Q 10/10 | 715/811 |
| 2013/0017523 A1* | 1/2013 | Barborak | G09B 7/04 | 434/322 |
| 2013/0158984 A1* | 6/2013 | Myslinski | G06F 17/28 | 704/9 |
| 2013/0173258 A1* | 7/2013 | Liu | G06F 17/2217 | 704/9 |
| 2013/0268519 A1* | 10/2013 | Cucerzan | G06F 17/30864 | 707/723 |
| 2014/0120513 A1* | 5/2014 | Jenkins | G06F 17/27 | 434/362 |
| 2014/0141401 A1* | 5/2014 | Agarwal | G09B 19/00 | 434/359 |
| 2014/0195238 A1* | 7/2014 | Terao | G10L 15/02 | 704/251 |
| 2014/0298199 A1* | 10/2014 | Johnson, Jr. | H04L 65/403 | 715/753 |
| 2015/0039536 A1* | 2/2015 | Cook | G06N 5/02 | 706/11 |
| 2015/0169395 A1* | 6/2015 | Giffels | G06F 11/0769 | 714/57 |
| 2015/0371137 A1* | 12/2015 | Giffels | G06F 17/2705 | 706/46 |
| 2016/0026634 A1* | 1/2016 | Allen | G06F 17/3053 | 707/740 |
| 2016/0048514 A1* | 2/2016 | Allen | G06F 17/3043 | 707/731 |
| 2016/0078351 A1* | 3/2016 | Clark | G06N 5/022 | 706/11 |
| 2016/0092884 A1* | 3/2016 | Weaver | G06Q 30/018 | 705/317 |
| 2016/0098444 A1* | 4/2016 | Berajawala | G06F 17/3053 | 707/752 |
| 2016/0117386 A1* | 4/2016 | Ajmera | G06F 17/30684 | 707/740 |

OTHER PUBLICATIONS

Furbach, et al. "An application of automated reasoning in natural language question answering." Ai Communications 23.2-3, 2010, pp. 241-265.*

Kokubu, Tomoharu, et al. "The Relationship between Answer Ranking and User Satisfaction in a Question Answering System." NTCIR. Dec. 2005, pp. 1-8.*

Kor, et al. "Interesting nuggets and their impact on definitional question answering." Proceedings of the 30th annual international ACM SIGIR conference on Research and development in information retrieval. ACM, Jul. 2007, pp. 335-342.*

Peñas, Anselmo, et al. "Overview of QA4MRE at CLEF 2011: Question Answering for Machine Reading Evaluation." CLEF (Notebook Papers/Labs/Workshop). 2011, pp. 1-20.*

Tellex, Stefanie, et al. "Quantitative evaluation of passage retrieval algorithms for question answering." Proceedings of the 26th annual international ACM SIGIR conference on Research and development in information retrieval. ACM, Aug. 2003, pp. 1-7.*

Thomas, Paul, et al. "Evaluation by comparing result sets in context." Proceedings of the 15th ACM international conference on Information and knowledge management. ACM, Nov. 2006, pp. 1-8.*

Gandrabur et al., "Confidence Estimation for NLP Applications," ACM Transactions on Speech and Language Processing (TSLP), vol. V, No. N, Feb. 2006, pp. 1-28.

* cited by examiner

US 9,589,049 B1

CORRECTING NATURAL LANGUAGE PROCESSING ANNOTATORS IN A QUESTION ANSWERING SYSTEM

BACKGROUND

Natural language processing (NLP) is a field of computer science, artificial intelligence, and computational linguistics concerned with the interactions between computers and human ("natural") languages. As such, NLP is related to the area of human-computer interaction. Many challenges in NLP involve natural language understanding, that is, enabling computers to derive meaning from human or natural language input, and others involve natural language generation. NLP is used in question answering (QA) systems, such as in IBM's Watson™ computer system which is an artificially intelligent computer system that is capable of answering questions posed in natural language. Because of the use of NLP in QA systems, such as Watson™, correctly processing natural language is quite important. Mistakes in performing NLP can lead to incorrect answers output from the QA system.

QA systems often employ NLP concept detection annotators. These NLP concept detection annotators are never perfect. When customers discover a problem with the annotators, there is often a significant lag between spotting and reporting a problem and ultimately receiving a correction to the problem delivered in a deployment update by the NLP developers. The problem is exacerbated when an NLP model has already been deemed "acceptable" and the NLP development team has moved on to delivering/supporting other NLP functions. Given the high rate of defects in NLP-derived data, combined with the critical importance of data accuracy to the QA system, such defects pose a significant challenge to scaling the QA system to new ventures. This is because it is difficult for NLP developers to focus on such new ventures if they need to expend significant time and resources to correcting problems in existing NLP models.

BRIEF SUMMARY

An approach is provided to correct natural language processing (NLP) annotators. The approach operates by receiving a set of supporting text noted by a user in response to the user identifying an error to a user question in a question answering (QA) system. The set of supporting text includes one or more text passages from which a correct answer should have been generated by the QA system. The QA system generates one or more scored candidate corrections with each of the scored candidate corrections is based on the identified error and the set of supporting text. The user can then select one or more of the scored candidate corrections as a confirmed correction to the error. The confirmed corrections are then applied to a corpus that is utilized by the QA system when answering questions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
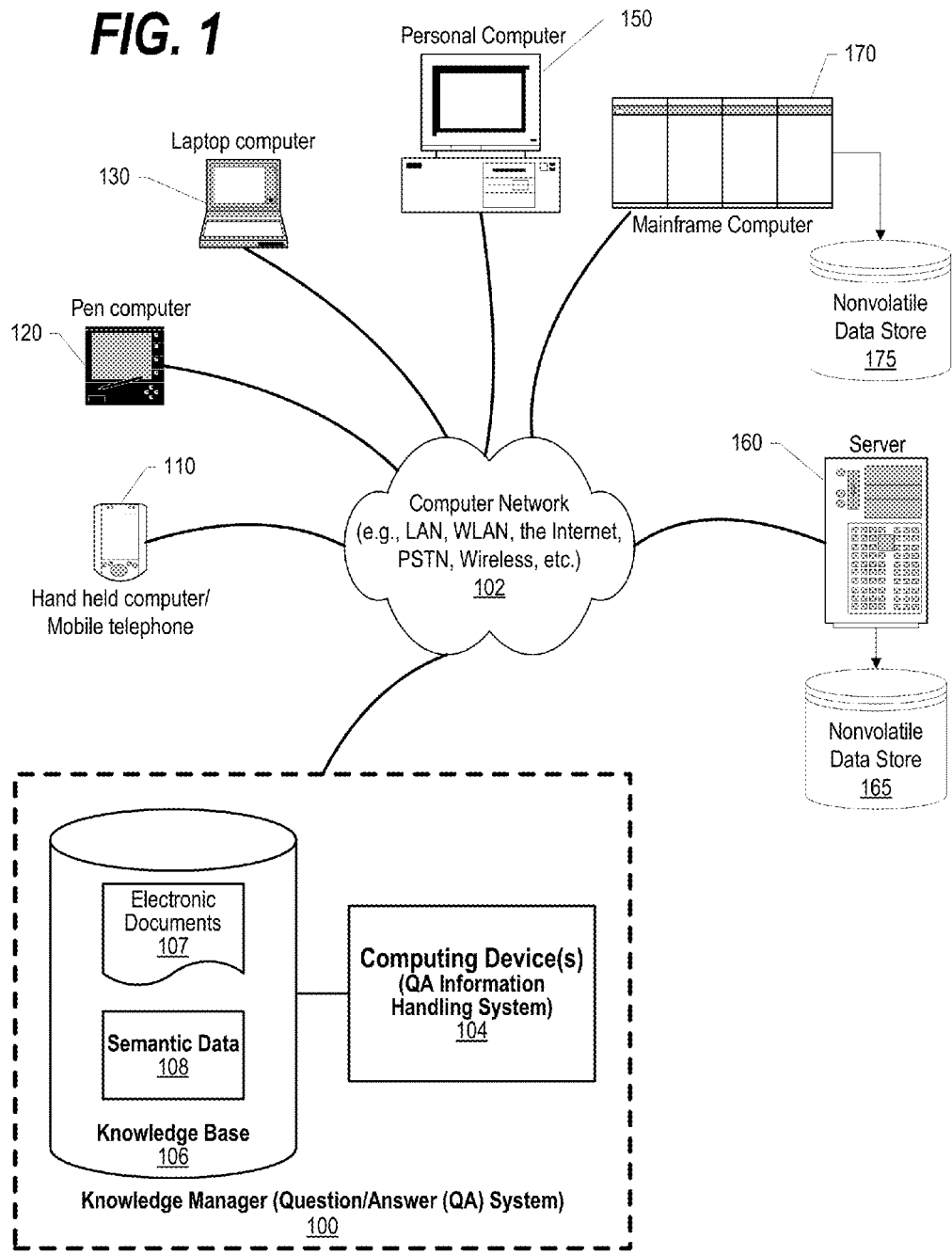
FIG. 1 depicts a schematic diagram of one illustrative embodiment of a question answering (QA) system in a computer network.

FIGS. 1-8 depict an approach that enables end users of a question answering (QA) system to correct errors they discover in natural language processing (NLP) annotators. The end users need no particular NLP expertise to perform the functions as the approach described herein provides such needed expertise and testing. Candidate fixes are generated, evaluated against a gold set, and displayed to the end user in natural language for the end user's review and possible approval.

The approach generates NLP correction candidates, scores such candidates, and provides a natural language explanation of candidate NLP corrections to false positive (FP) and false negative (FN) errors reported by the end user. Annotations are evaluated in context and within a corpora to identify annotation patterns responsible for the reported FP/FN errors. The process performs an introspection of NLP models to identify the key source of such FP/FN errors and the underlying nature of the required correction. This process includes artifacts nested layers below the annotation of concern. For example, the error could be due to a simple missing surface form in a dictionary (FN) or an erroneous or out of context dictionary entry or rule producing a FP annotation.

The process further computes confidence scores for candidate corrections based on internal and external data points. These data points can include configurable biases in where corrections are applied (e.g., favor dictionary updates versus parsing rules, etc.), the nature of a coding change and the likely resulting downstream errors (e.g., false negatives versus false positives, etc.), the number of lines of code that are updated, and the number of artifacts that are impacted by the error and the resulting correction.

The approach further generates a natural language positing of ranked candidate fixes for confirmation from the end user. In addition, when a correction is found, the approach provides automatic application of the confirmed correction to the underlying NLP annotators and artifacts.

In one embodiment, the user utilizes a text editor to highlight text that should have been detected for a given concept (in the case of a false negative) or delete an annotation that should not have been detected (in the case of a false positive). Based on the nature of the error (false negative/false positive), a cause analysis component inspects the immediate context, contextual patterns for the concept within a corpus, and the NLP model (dictionaries, parsing rules, etc) to generate a set of candidate corrections. The surrounding context is analyzed (annotations found therein) and matched against similar context in the corpora. Candidate anomalies are generated and corresponding fix candidates are generated for each anomaly.

Candidate corrections are evaluated and scored based on a variety of potential factors. These potential factors might include (1) the impact on recall/precision within a gold set ("ground truth") data set. This impact can be based on either a sampling of the gold set if performance is a concern, or the full gold set; (2) the nature of the updated artifact (e.g. dictionary, parsing rule, regex, etc); (3) the number of lines of code required for the correction; and (4) the number of artifacts needing to be updated.

Depending on the configuration and the confidence scores, corrections to the NLP annotators can either be applied hands-off (automatically) or input can be requested of the end user. Supporting evidence of candidate fixes are displayed to the end user as part of the confirmation process. For example, in the case of false positive (FP) errors: A sampling of annotations within context that would be dropped if the change were to be applied is displayed as supporting evidence (or further refinement) of a given candidate fix. Similarly, in the case of false negative (FN) errors: A sampling of annotations within context the would now be detected if the change were to be applied is displayed as supporting evidence (or further refinement) of a given candidate fix.

For example, in a medical environment, the QA system may have provided a false negative (FN) when analyzing a patient's records with the system not recognizing that the patient has symptoms for heart disease. The medical professional, upon reviewing the QA system results and detecting that the system provided a FN, can provide supporting text by highlight portions of the patient's records (e.g., "chest pain," high blood pressure reading, high cholesterol, etc.) and note that the correct response, or answer, from the QA system should have been "heart disease." The system analyzes the context from the supporting text provided by the user, matches the context against similar context in the QA system's corpus, and generates candidate corrections designed to correct the error noted by the user. The user can select one or more of the candidate corrections and those corrections are applied to the QA system. In one embodiment, confirmed corrections are tested against a set of "ground truth" data before applying the confirmed candidate corrections to the QA system corpus for use by subsequent executions of the QA system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
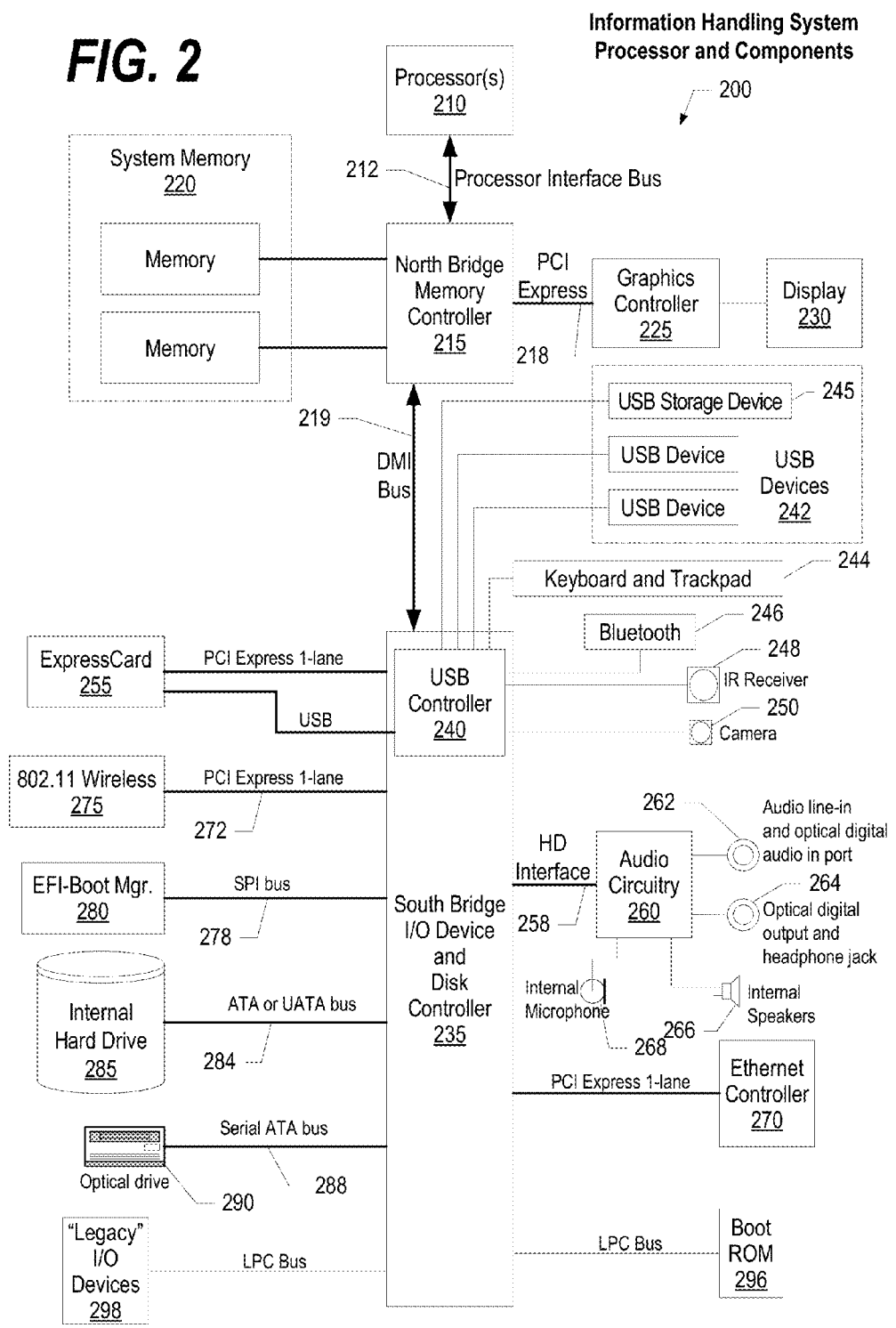
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE. 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
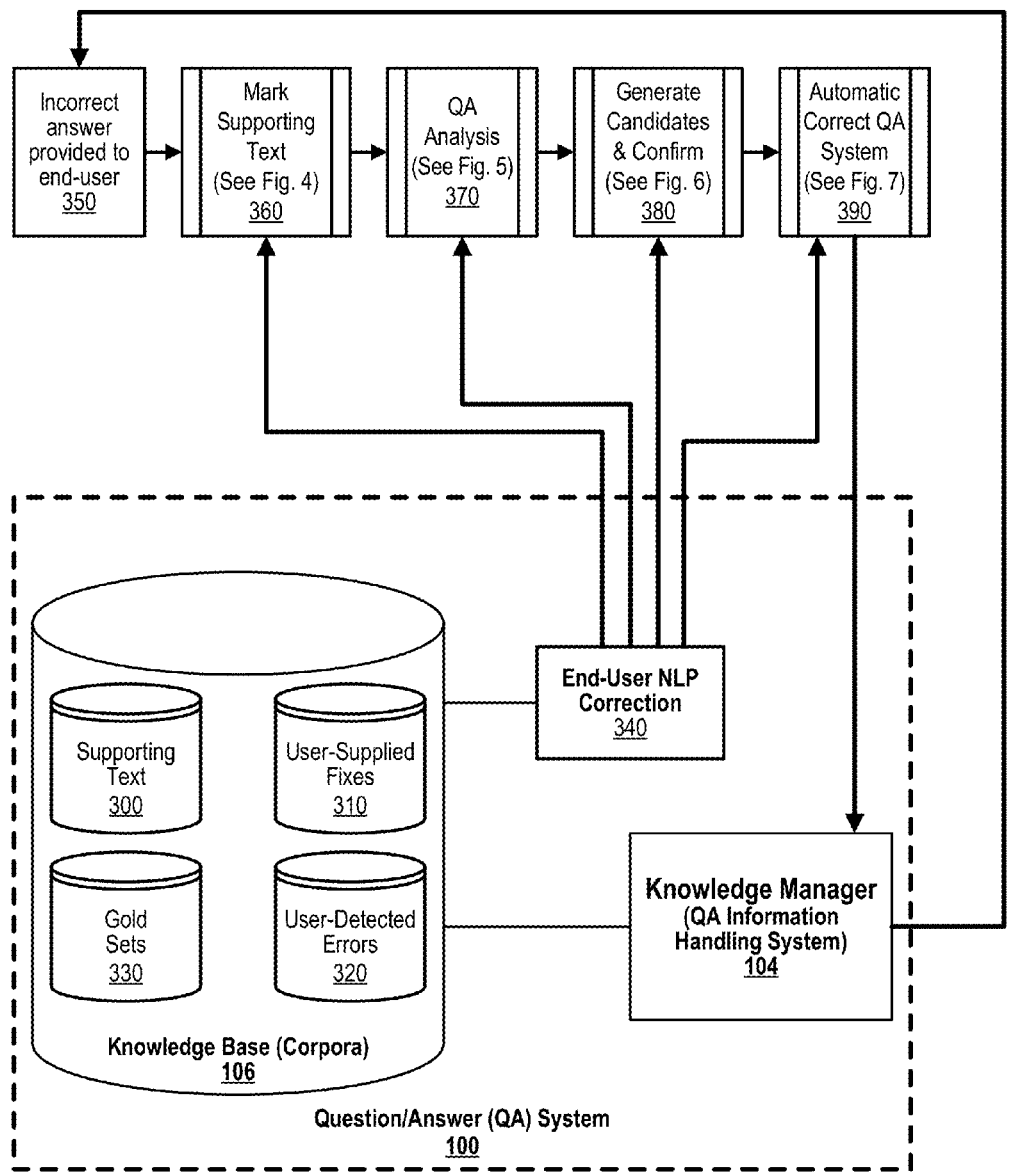
FIG. 3 is an exemplary diagram depicting process flow and components involved in correcting natural language processing (NLP) annotators.

FIG. 3 is an exemplary diagram depicting process flow and components involved in correcting natural language processing (NLP) annotators. Question answering (QA) system 100 includes QA information handling system 104 (e.g., the QA system's pipeline, etc.) and end user NLP correction process 340 that facilitates correction of the NLP utilized by the QA system. Corpus 106 that is utilized by the QA system when answering questions also includes additional and modified data stores to support the end user NLP correction process. These additional and modified data stores include supporting text 300 which is supporting text noted by the user in response to the user identifying an error to a question posed to the QA system with the supporting text including text passages from which a correct answer should have been generated by the QA system. Data store 310 is a set of user-supplied fixes, or corrections, to answers provided by the QA system. Data store 320 are user-detected errors with the errors being generated by the QA system in response to a question posed by the user.

From the previous example regarding the false negative (FN) reported for the patient that should have been diagnosed with "heart disease," the user-supplied correction would be "heart disease" and this correction corresponds to the supporting text identified by the user and stored in data store 300. User detected errors would be errors identified by the user. For example, if the QA system provided an incorrect answer (false positive or FP) that a patient had "diabetes" instead of "heart disease" then the diabetes would be included as a user-detected error.

The end user NLP correction process begins when a user, such as a medical professional using the examples from above, uses the QA system and receives an incorrect answer to a user provided question (step 350). The end user NLP correction process includes a number of sub processes, shown as predefined processes 360 through 390.

Figure 4:
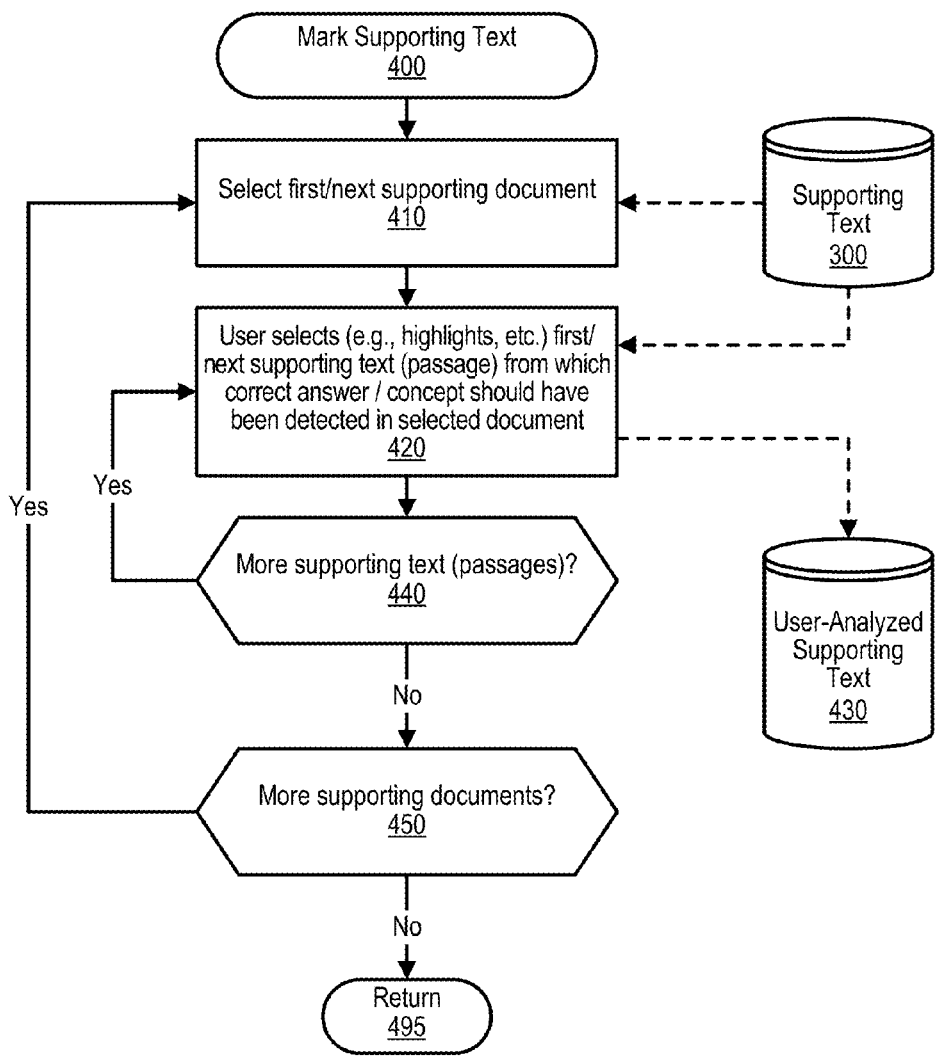
FIG. 4 is an exemplary flowchart that performs steps to allow a user to mark supporting text in one or more documents when an error in an NLP annotator is discovered.

At predefined process 360, the process performs the Mark Supporting Text routine during which the user marks supporting text from documents from which a correct answer should have been found by the QA system (see FIG. 4 and corresponding text for processing details). At predefined process 370, the process performs the QA Analysis routine that analyzes the context proximate to the supporting text noted by the user and generates a set of candidate anomalies by comparing the context to a similar context found in the QA system corpora (see FIG. 5 and corresponding text for processing details).

Figure 6:
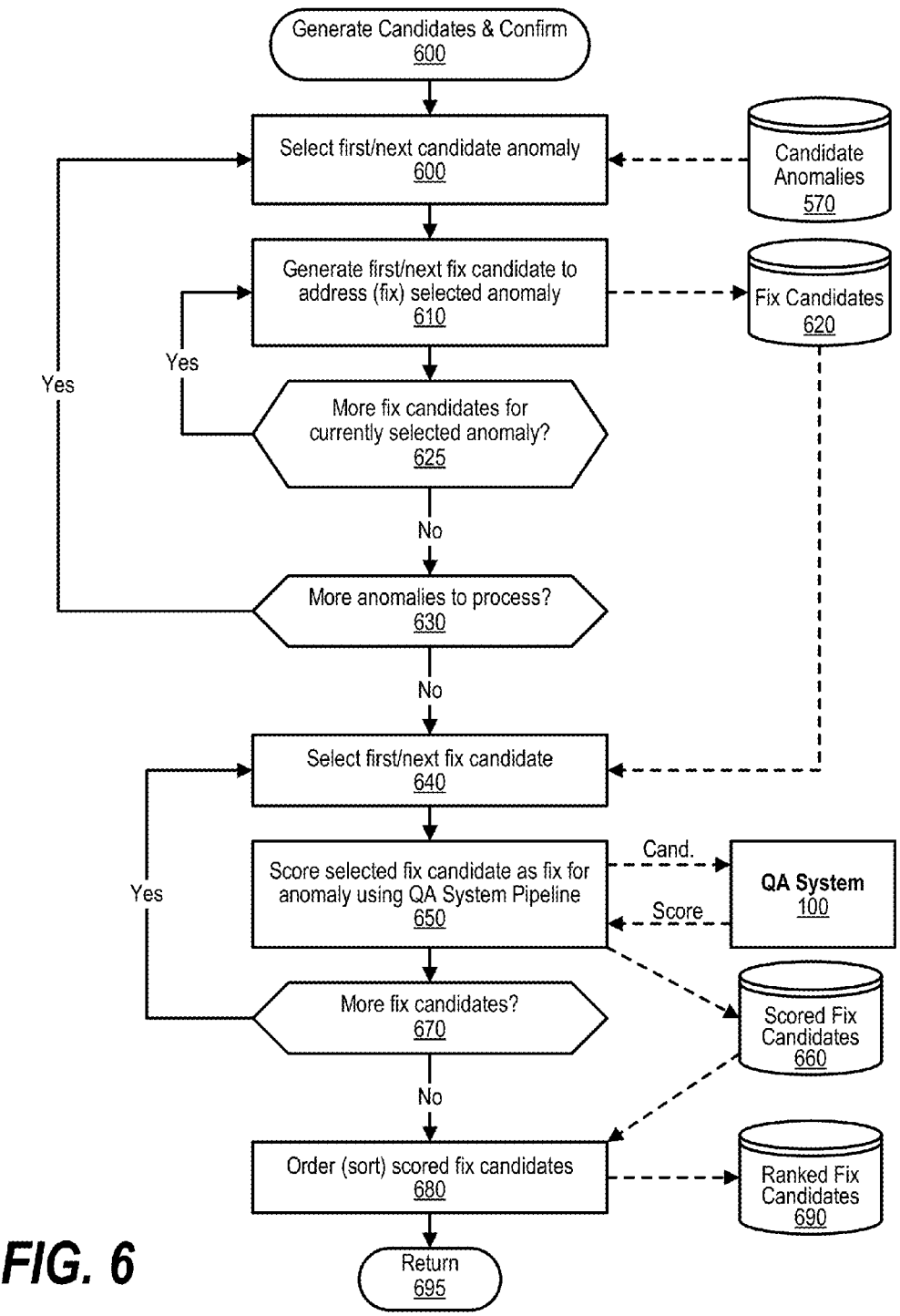
FIG. 6 is an exemplary flowchart showing steps generates candidates to correct the error noted by the user with such candidates being scored by the question answering (QA) system.

At predefined process 380, the process performs the Generate Candidates and Confirm routine during which the system generates correction candidates based on the anomalies found by predefined process 370 (see FIG. 6 and corresponding text for processing details). Finally, at predefined process 390, the process performs the Automatic Correct QA System routine during which, under certain conditions, the corpus utilized by the QA system is automatically updated based on the error reporting data provided by the end user (see FIG. 7 and corresponding text for processing details).

FIG. 4 is an exemplary flowchart that performs steps to allow a user to mark supporting text in one or more documents when an error in an NLP annotator is discovered. FIG. 4 processing commences at 400 and shows the steps taken by a process that marks supporting text to correct natural language processing (NLP) used by a question answering (QA) system. At step 410, the process selects the first supporting document from data store 300 that includes the various documents available to the QA system including those documents relied upon by the QA decision when the incorrect answer was generated.

At step 420, the user selects the first supporting text (or "passages") from which correct answer or correct concept should have been detected in one of the selected documents. in one embodiment, the user marks the supporting text by highlighting the text, such as by using a mouse or other input device. The selected text marked by the user is stored in data store 430. The process determines as to whether there are more supporting text passages that the user wishes to select (decision 440). If there are more supporting text passages that the user wishes to select, then decision 440 branches to the 'yes' branch which loops back to receive the next supporting text selection from the user. This looping continues until there are no more supporting text passages that the user wishes to select, at which point decision 440 branches to the 'no' branch exiting the loop.

The process determines as to whether there are more supporting documents from which the user wishes to select supporting text (decision 450). If there are more supporting documents from which the user wishes to select supporting text, then decision 450 branches to the 'yes' branch which loops back to select the next supporting document as described above. This looping continues until there are no more supporting documents from which the user wishes to select supporting text, at which point decision 450 branches to the 'no' branch exiting the loop. FIG. 4 processing thereafter returns to the calling routine (see FIG. 3) at 495.

Figure 5:
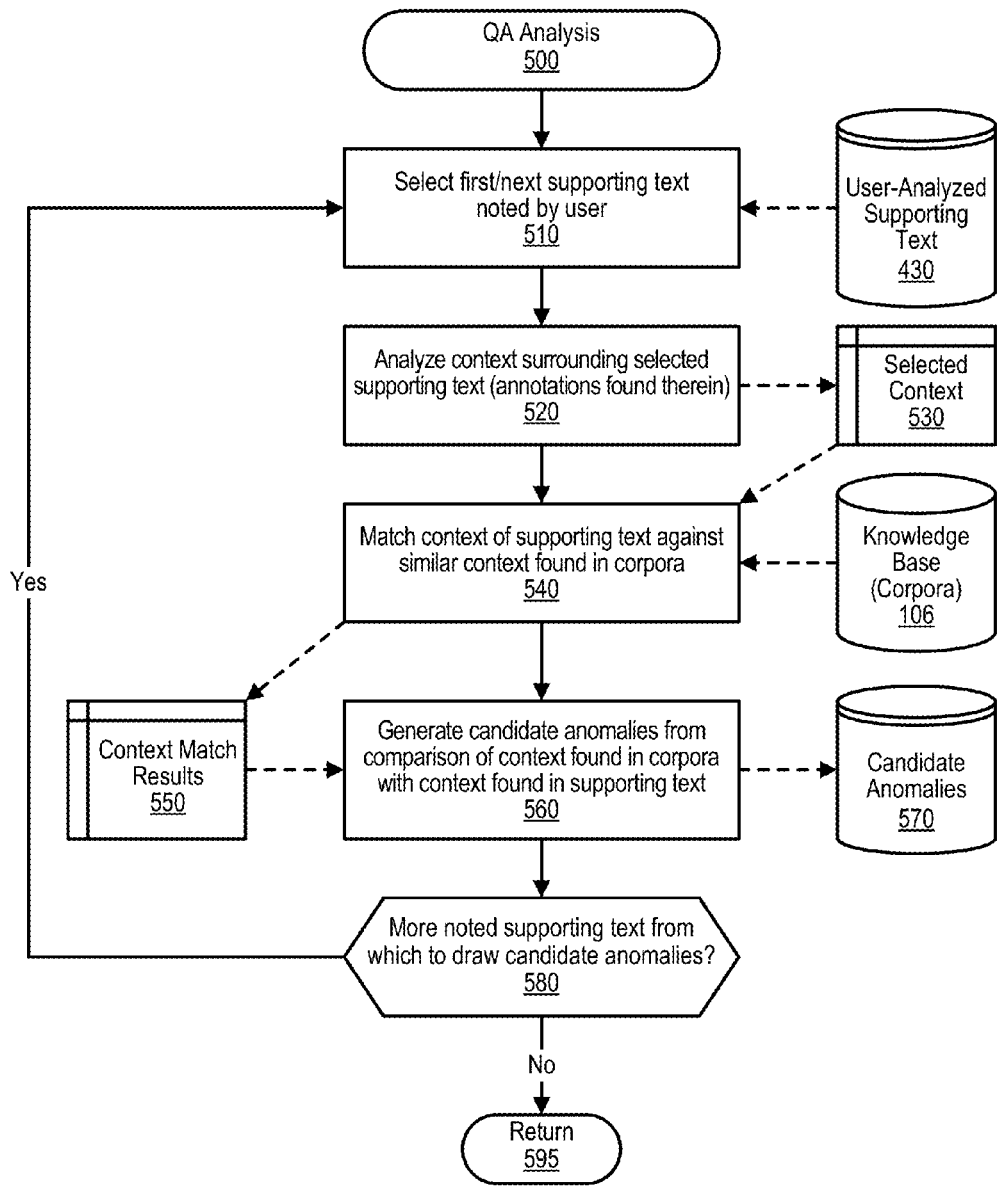
FIG. 5 is an exemplary flowchart that performs an analysis by the question answering (QA) system of the supporting text noted by the user.

FIG. 5 is an exemplary flowchart that performs an analysis by the question answering (QA) system of the supporting text noted by the user. FIG. 5 processing commences at 500 and shows the steps taken by a process that the question answering (QA) system performs to analyze the supporting text that was selected by the user relating to an incorrect answer provided by the QA system. At step 510, the process selects the first supporting text that was noted by user. Step 510 retrieves the user-analyzed supporting text from data store 430.

At step 520, the process analyzes the context surrounding, or proximate to, the selected supporting text with the supporting text including annotations found in the selected text and proximate area. The context resulting from step 520 is stored in selected context memory area 530. At step 540, the process matches the context found in the supporting text against similar contexts found in the QA system's corpora (data store 106). The context match results are stored in memory area 550. At step 560, the process generates a set of one or more candidate anomalies from the comparison of the context found in the QA system corpora with the context found in supporting text. These candidate anomalies are stored in data store 570.

The process determines as to whether there are more supporting text entries noted by the user from which to draw candidate anomalies (decision 580). If there are more supporting text entries noted by the user from which to draw candidate anomalies, then decision 580 branches to the 'yes' branch which loops back to select and process the next supporting text from data store 430 as described above. This looping continues until there are no more supporting text entries noted by the user from which to draw candidate anomalies, at which point decision 580 branches to the 'no' branch exiting the loop. FIG. 5 processing thereafter returns to the calling routine (see FIG. 3) at 595.

FIG. 6 is an exemplary flowchart showing steps generates candidates to correct the error noted by the user with such candidates being scored by the question answering (QA) system. FIG. 6 processing commences at 600 and shows the steps taken by a process that generates correction candidates. At step 600, the process selects the first candidate anomaly from the list of candidate anomalies stored in data store 570. At step 610, the process generates the first correction candidate to address, or "fix" the selected anomaly. The correction candidates are stored in correction candidates data store 620. The process determines as to whether there are more correction candidates to address the currently selected anomaly (decision 625). If there are more correction candidates to address the currently selected anomaly, then decision 625 branches to the 'yes' branch which loops back to generate the next correction candidate as described above. This looping continues until there are no more correction candidates to address the currently selected anomaly, at which point decision 625 branches to the 'no' branch exiting the loop. The process next determines as to whether there are more anomalies to process from the list of anomalies stored in data store 570 (decision 630). If there are more anomalies to process, then decision 630 branches to the 'yes' branch which loops back to select and process the next anomaly as described above. This looping continues until there are no more anomalies to process, at which point decision 630 branches to the 'no' branch exiting the loop.

At step 640, the process selects the first correction candidate from data store 620. At step 650, the process scores the selected correction candidate as a possible correction for its corresponding anomaly using the QA System Pipeline from QA system 100. Step 650 stores the scored correction candidates in data store 660. The process determines as to whether there are more correction candidates in data store 620 left to process (decision 670). If there are more correction candidates in data store 620 left to process, then decision 670 branches to the 'yes' branch which loops back to select and score the next correction candidate from data store 620. This looping continues until there are no more correction candidates in data store 620 left to process, at which point decision 670 branches to the 'no' branch exiting the loop. At step 680, the process orders, or sorts, the scored correction candidates based on the score obtained by the correction candidates. Step 680 stores the scored correction candidates in ranked correction candidates data store 690. FIG. 6 processing thereafter returns to the calling routine (see FIG. 3) at 695.

Figure 7:
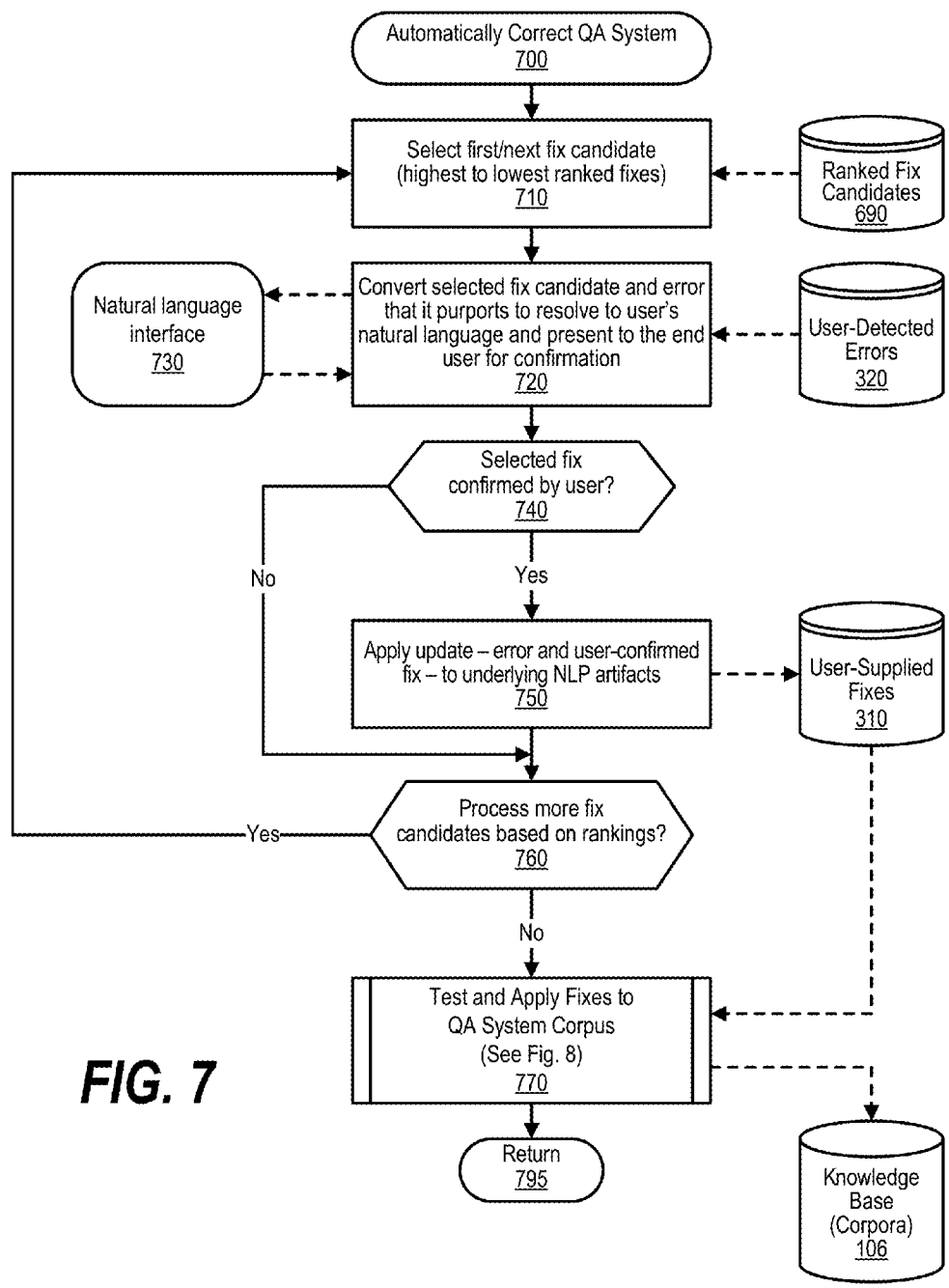
FIG. 7 is an exemplary flowchart showing steps that automatically corrects the NLP annotators utilized by the question answering (QA) system when a correction is found to the error noted by the user.

FIG. 7 is an exemplary flowchart showing steps that automatically corrects the NLP annotators utilized by the question answering (QA) system when a correction is found to the error noted by the user. FIG. 7 processing commences at 700 and shows the steps taken by a process that automatically correct errors found in the question answering (QA) system using the user provided error data and supporting text noted by the end user. At step 710, the process selects the first correction candidate from the highest ranked correction candidate to the lowest ranked correction candidate. The ranked correction candidates are retrieved from data store 690.

At step 720, the process converts the selected correction candidate and the error that it purports to resolve to the user's natural language (e.g., English, Spanish, etc.) and presents the natural language equivalent of the selected correction candidate to the end user for confirmation. Step 720 retrieves the user-detected errors from data store 320 and presents the natural language equivalent of the selected correction candidate to the end user for confirmation at natural language interface 730, such as a graphic user interface (GUI) dialog provided by the system.

The process determines as to whether the selected correction was confirmed by the user using interface 730 (decision 740). If the selected correction was confirmed by the user, then decision 740 branches to the 'yes' branch whereupon, at step 750, the process applies the update, including the user-detected error and the user-confirmed correction, to the underlying NLP artifacts utilized by the QA system. The user-detected error and the user-confirmed correction are stored in data store 310. On the other hand, if the selected correction was not confirmed by the user, then decision 740 branches to the 'no' branch bypassing step 750.

The process determines as to whether to process additional correction candidates based on their respective rankings (decision 760). For example, a threshold or setting may be set so that the number of correction candidates that are reviewed for confirmation by the user are limited to the top candidates. In addition, the user may decide that no further correction candidates need to be processed by so indicating using a GUI control (e.g., "end" command button, etc.)

provided by interface 730. If additional correction candidates are being processed, then decision 760 branches to the 'yes' branch which loops back to step 710. This looping continues until no additional correction candidates are being processed, at which point decision 760 branches to the 'no' branch exiting the loop.

Figure 8:
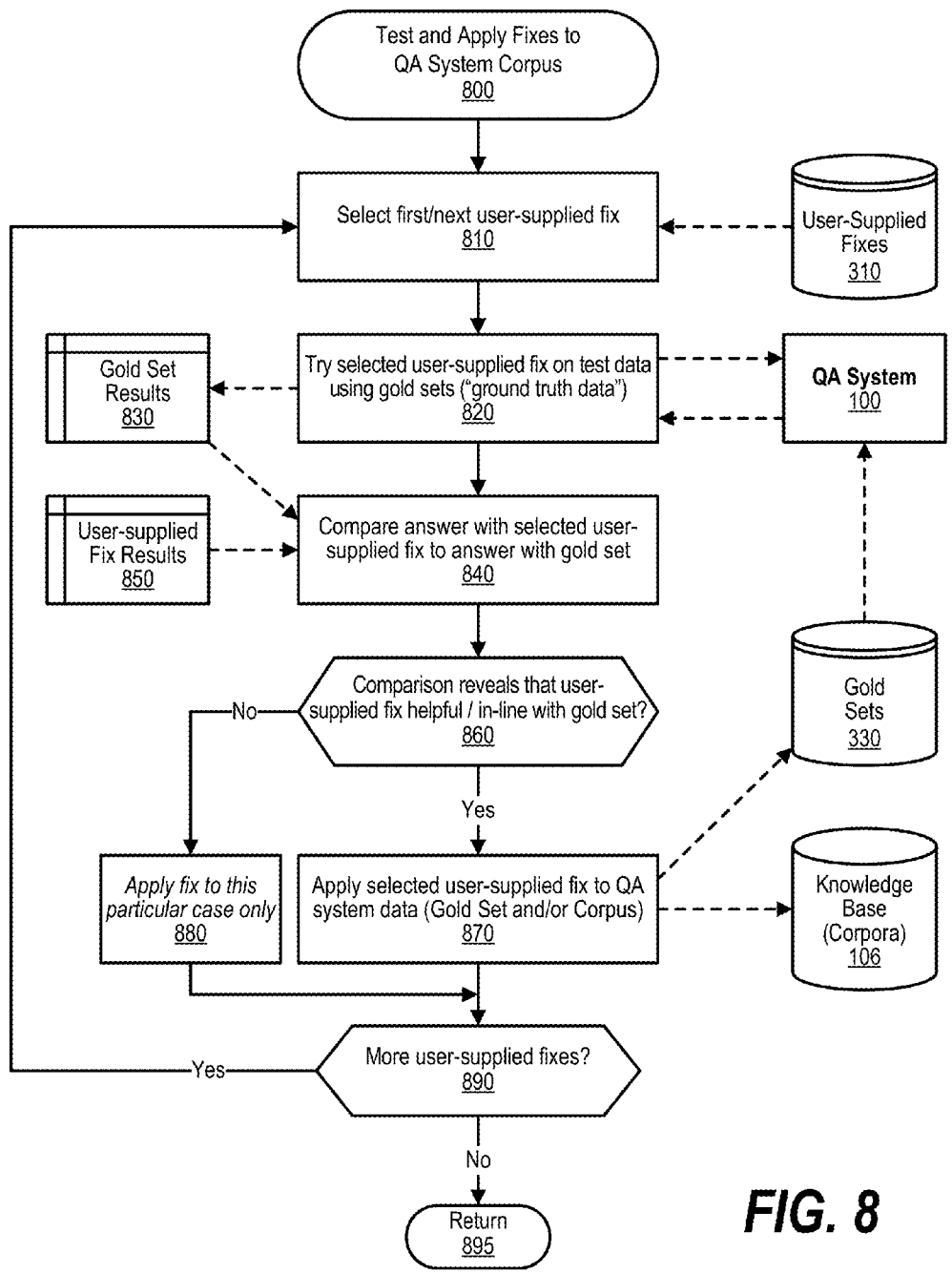
FIG. 8 is an exemplary flowchart showing steps that tests and applies corrections to the QA system corpus.

At predefined process 770, the process performs the Test and Apply Fixes to QA System Corpus routine (see FIG. 8 and corresponding text for processing details). Predefined process 770 processes the user supplied corrections from data store 310 and updates the QA system's knowledge base (corpus 106). FIG. 7 processing thereafter returns to the calling routine (see FIG. 3) at 795.

FIG. 8 is an exemplary flowchart showing steps that tests and applies corrections to the QA system corpus. FIG. 8 processing commences at 800 and shows the steps taken by a process that tests and applies corrections to the underlying QA System corpus. At step 810, the process selects the first user-supplied correction from data store 310.

At step 820, the process tests the selected user-supplied correction on test data using gold sets of known-truthful data (e.g., "ground truth data," etc). To perform the test, the user-supplied correction data is submitted to QA system 100. QA system 100 receives the known-truthful data from data store 330. Step 820 stores the results of the test in gold set results memory area 830. At step 840, the process compares the answer from the selected user-supplied correction to the answer provided by the QA system utilizing the gold set of known truthful data. Step 840 retrieves the from user-supplied correction results (e.g., correct answer as provided by the end user, etc.) from memory area 850.

The process determines as to whether the comparison performed at step 840 reveals that the user-supplied correction was helpful (compatible) with the gold set of known truthful data (decision 860). If the comparison reveals that the user-supplied correction is compatible with the known truthful data, then decision 860 branches to the 'yes' branch whereupon, at step 870, the process applies the selected user-supplied correction to the QA system data (e.g., Gold Set of data and/or corpus 106 utilized by the QA system, etc.). On the other hand, if the comparison reveals that the user-supplied correction is incompatible with the known truthful data, then decision 860 branches to the 'no' branch whereupon, at step 880, the process applies the correction to this particular case (e.g., patient file, etc.) only and refrains from applying the correction to the QA system corpus.

The process determines as to whether there are more user-supplied corrections stored in data store 310 to process (decision 890). If there are more user-supplied corrections to process, then decision 890 branches to the 'yes' branch which loops back to step 810 to select and process the next user-supplied correction. This looping continues until there are no more user-supplied corrections to process, at which point decision 890 branches to the 'no' branch exiting the loop. FIG. 8 processing thereafter returns to the calling routine (see FIG. 7) at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving a set of supporting text noted by a user in response to the user identifying an error returned by a question answering (QA) system responsive to a question posed by the user, wherein the set of supporting text includes one or more text passages from which a correct answer should have been generated by the QA system;
   generating one or more candidate anomalies by comparing a context found proximate to an area of one or more of the supporting texts noted by the user to one or more similar contexts found in a corpora of the QA system;
   generating, by the QA system, one or more scored candidate corrections, wherein each of the scored candidate corrections is based on at least one of the generated candidate anomalies;
   selecting, by the user, one or more of the scored candidate corrections as a confirmed correction to the error; and
   applying the one or more confirmed corrections to a corpus utilized by the QA system when answering questions.

2. The method of claim 1 further comprising:
   automatically generating a correction candidate pertaining to one or more of the candidate anomalies;
   scoring each of the correction candidates; and
   ranking the correction candidates based on the scoring.

3. The method of claim 2 further comprising:
   converting each of the correction candidates to a natural language equivalent;
   presenting the natural language equivalents to the user;
   receiving one or more selections from the user pertaining to the natural language equivalents; and
   applying the confirmed corrections to the corpus utilized by the QA system.

4. The method of claim 3 wherein the applying of the confirmed corrections further comprises:
   utilizing the confirmed corrections on a set of ground truth test data, the utilizing resulting in a test result;
   comparing the test result with a user-supplied correction result; and
   adding the confirmed corrections to the corpus utilized by the QA system in response to the comparison revealing that the user-supplied correction result is compatible with the test result.

5. The method of claim 4 further comprising:
   in response to the comparison revealing that the user-supplied correction result is incompatible with the test result, applying the confirmed corrections to a particular case from which the set of supporting text was taken without updating the corpus utilized by the QA system when processing subsequent cases.

6. The method of claim 1 wherein the receiving of the set of supporting text noted by a user further comprises:
   receiving a selection of a plurality of textual highlights noted by the user in the one or more text passages.

7. An information handling system comprising:
   one or more processors;
   one or more data stores accessible by at least one of the processors;
   a display accessible by at least one of the processors;
   a memory coupled to at least one of the processors; and
   a set of computer program instructions stored in the memory and executed by at least one of the processors in order to perform actions of:
      receiving a set of supporting text noted by a user in response to the user identifying an error returned by a question answering (QA) system responsive to a question posed by the user, wherein the set of supporting text includes one or more text passages from which a correct answer should have been generated by the QA system;
      generating one or more candidate anomalies by comparing a context found proximate to an area of one or more of the supporting texts noted by the user to one or more similar contexts found in a corpora of the QA system;
      generating, by the QA system, one or more scored candidate corrections, wherein each of the scored candidate corrections is based on at least one of the generated candidate anomalies;
      receiving a selection from the user of one or more of the scored candidate corrections as a confirmed correction to the error; and
      applying the one or more confirmed corrections to a corpus utilized by the QA system when answering questions.

8. The information handling system of claim 7 wherein the actions further comprise:
   automatically generating a correction candidate pertaining to one or more of the candidate anomalies;
   scoring each of the correction candidates; and
   ranking the correction candidates based on the scoring.

9. The information handling system of claim 8 wherein the actions further comprise:
   converting each of the correction candidates to a natural language equivalent;
   presenting the natural language equivalents to the user;
   receiving one or more selections from the user pertaining to the natural language equivalents; and
   applying the confirmed corrections to the corpus utilized by the QA system.

10. The information handling system of claim 9 wherein the applying of the confirmed corrections further comprises:
    utilizing the confirmed corrections on a set of ground truth test data, the utilizing resulting in a test result;
    comparing the test result with a user-supplied correction result; and
    adding the confirmed corrections to the corpus utilized by the QA system in response to the comparison revealing that the user-supplied correction result is compatible with the test result.

11. The information handling system of claim 10 further comprising:
    in response to the comparison revealing that the user-supplied correction result is incompatible with the test result, applying the confirmed corrections to a particular case from which the set of supporting text was taken without updating the corpus utilized by the QA system when processing subsequent cases.

12. The information handling system of claim 7 wherein the receiving of the set of supporting text noted by a user further comprises actions of:
    receiving a selection of a plurality of textual highlights noted by the user in the one or more text passages.

13. A computer program product stored in a computer readable storage medium, comprising computer program code that, when executed by an information handling system, causes the information handling system to perform actions comprising:
    receiving a set of supporting text noted by a user in response to the user identifying an error returned by a question answering (QA) system responsive to a question posed by the user, wherein the set of supporting text includes one or more text passages from which a correct answer should have been generated by the QA system;
    generating one or more candidate anomalies by comparing a context found proximate to an area of one or more of the supporting texts noted by the user to one or more similar contexts found in a corpora of the QA system;
    generating, by the QA system, one or more scored candidate corrections, wherein each of the scored candidate corrections is based on at least one of the generated candidate anomalies;
    receiving a selection from the user of one or more of the scored candidate corrections as a confirmed correction to the error; and
    applying the one or more confirmed corrections to a corpus utilized by the QA system when answering questions.

14. The computer program product of claim 13 wherein the actions further comprise:
    automatically generating a correction candidate pertaining to one or more of the candidate anomalies;
    scoring each of the correction candidates; and
    ranking the correction candidates based on the scoring.

15. The computer program product of claim 14 wherein the actions further comprise:
    converting each of the correction candidates to a natural language equivalent;
    presenting the natural language equivalents to the user;
    receiving the one or more confirmed corrections from the user pertaining to the natural language equivalents; and
    applying the confirmed corrections to the corpus utilized by the QA system.

16. The computer program product of claim 15 wherein the applying of a selected one of the correction candidates further comprises actions of:
    utilizing the selected correction candidate on a set of ground truth test data, the utilizing resulting in a test result;
    comparing the test result with a user-supplied correction result; and
    adding the selected correction candidate to the corpus utilized by the QA system in response to the comparison revealing that the user-supplied correction result is compatible with the test result.

17. The computer program product of claim 16 wherein the actions further comprise:
    in response to the comparison revealing that the user-supplied correction result is incompatible with the test result, applying the selected correction to a particular case from which the set of supporting text was taken without updating the corpus utilized by the QA system when processing subsequent cases.

* * * * *